(12) United States Patent
Hou et al.

(10) Patent No.: US 10,365,392 B2
(45) Date of Patent: Jul. 30, 2019

(54) MULTI-STEP BOREHOLE CORRECTION SCHEME FOR MULTI-COMPONENT INDUCTION TOOLS

(71) Applicant: HALLIBURTON ENERGY SERVICES, INC., Houston, TX (US)

(72) Inventors: Junsheng Hou, Humble, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 50 days.

(21) Appl. No.: 15/169,423

(22) Filed: May 31, 2016

(65) Prior Publication Data

US 2016/0274263 A1 Sep. 22, 2016

Related U.S. Application Data

(63) Continuation of application No. 13/521,756, filed as application No. PCT/US2011/030145 on Mar. 28, 2011, now Pat. No. 9,364,905.
(Continued)

(51) Int. Cl.
*G01V 3/26* (2006.01)
*G01V 3/28* (2006.01)
(Continued)

(52) U.S. Cl.
CPC ............... *G01V 3/26* (2013.01); *B23D 31/00* (2013.01); *F15B 15/14* (2013.01); *G01V 3/28* (2013.01); *G01V 3/30* (2013.01)

(58) Field of Classification Search
CPC ........... B23D 31/00; F15B 15/14; G01V 3/26; G01V 3/28; G01V 3/30
See application file for complete search history.

(56) References Cited

U.S. PATENT DOCUMENTS 4,980,643 A 12/1990 Gianzero et al.
5,389,881 A 2/1995 Bittar et al.
(Continued)

FOREIGN PATENT DOCUMENTS

EP 1315984 1/2011
EP 1155343 3/2011
(Continued)

OTHER PUBLICATIONS

GCC Examination Report, dated Apr. 17, 2016, Appl No. GC 2012-2243, "Multi-Component Induction Logging Systems and Methods Using Real-Time OBM Borehole Correction, " filed Sep. 12, 2012, 8 pgs.
(Continued)

*Primary Examiner* — Kyle R Quigley
(74) *Attorney, Agent, or Firm* — Benjamin Fite; C. Tumey Law Group PLLC

(57) ABSTRACT

Various resistivity logging tools, systems, and methods are disclosed. At least some system embodiments include a logging tool and at least one processor. The logging tool provides transmitter-receiver coupling measurements that include at least direct coupling along the longitudinal tool axis (Czz), direct coupling along the perpendicular axis (Cxx or Cyy), and cross coupling along the longitudinal and perpendicular axes (Cxz, Cyz, Czx, or Czy). The processor performs a multi-step inversion of said transmitter-receiver coupling measurements to obtain values for model parameters. Based at least in part on the model parameters, the processor determines borehole corrections for the transmitter-receiver coupling measurements and may further provide one or more logs derived from the borehole corrected transmitter-receiver coupling measurements. In at least some embodiments the logging tool assembly further collects borehole size measurements and measurements of
(Continued)

borehole fluid resistivity for use in performing the inversion and determining the borehole corrections.

20 Claims, 8 Drawing Sheets

Related U.S. Application Data

(60) Provisional application No. 61/319,291, filed on Mar. 31, 2010.

(51) Int. Cl.
*B23D 31/00* (2006.01)
*F15B 15/14* (2006.01)
*G01V 3/30* (2006.01)

(56) References Cited

U.S. PATENT DOCUMENTS

| | | | |
|---|---|---|---|
| 5,511,037 A * | 4/1996 | Randall | E21B 47/00 |
| | | | 324/369 |
| 5,869,968 A | 2/1999 | Brooks et al. | |
| 5,999,883 A | 12/1999 | Gupta et al. | |
| 6,163,155 A | 12/2000 | Bittar | |
| 6,191,586 B1 | 2/2001 | Bittar | |
| 6,218,842 B1 | 4/2001 | Bittar | |
| 6,295,512 B1 * | 9/2001 | Bryant | G01V 3/02 |
| | | | 324/357 |
| 6,353,321 B1 | 3/2002 | Bittar | |
| 6,359,438 B1 | 3/2002 | Bittar | |
| 6,393,364 B1 | 5/2002 | Gao et al. | |
| 6,476,609 B1 | 11/2002 | Bittar | |
| 6,538,447 B2 | 3/2003 | Bittar | |
| 6,556,015 B1 | 4/2003 | Omeragic et al. | |
| 6,591,194 B1 | 7/2003 | Yu et al. | |
| 6,618,676 B2 | 9/2003 | Krieghauser et al. | |
| 6,624,634 B2 | 9/2003 | Rosthal et al. | |
| 6,693,430 B2 | 2/2004 | Rosthal et al. | |
| 6,725,162 B2 * | 4/2004 | Edwards | E21B 47/082 |
| | | | 324/338 |
| 6,810,331 B2 | 10/2004 | Bittar et al. | |
| 6,819,112 B2 | 11/2004 | Gianzero et al. | |
| 6,885,943 B2 | 4/2005 | Bittar et al. | |
| 6,911,824 B2 | 6/2005 | Bittar | |
| 6,944,546 B2 | 9/2005 | Xiao et al. | |
| 7,019,528 B2 | 3/2006 | Bittar | |
| 7,046,010 B2 | 5/2006 | Hu et al. | |
| 7,076,370 B1 | 7/2006 | Freedman et al. | |
| 7,098,664 B2 | 8/2006 | Bittar et al. | |
| 7,098,858 B2 | 8/2006 | Bittar et al. | |
| 7,138,803 B2 | 11/2006 | Bittar | |
| 7,138,897 B2 | 11/2006 | Minerbo et al. | |
| 7,227,363 B2 | 6/2007 | Gianzero et al. | |
| 7,265,552 B2 | 9/2007 | Bittar | |
| 7,345,487 B2 | 3/2008 | Bittar et al. | |
| 7,386,430 B2 | 6/2008 | Barber et al. | |
| 7,427,863 B2 | 9/2008 | Bittar | |
| 7,557,579 B2 | 7/2009 | Bittar | |
| 7,557,580 B2 | 7/2009 | Bittar | |
| 7,629,791 B2 | 12/2009 | Bespalov et al. | |
| 7,659,722 B2 | 2/2010 | Bittar | |
| 7,746,078 B2 | 6/2010 | Bittar et al. | |
| 7,778,778 B2 | 8/2010 | Bespalov et al. | |
| 7,839,148 B2 | 11/2010 | Vehra et al. | |
| 7,839,346 B2 | 11/2010 | Bittar et al. | |
| 7,948,238 B2 | 5/2011 | Bittar | |
| 7,982,464 B2 | 7/2011 | Bittar et al. | |
| 8,030,937 B2 | 10/2011 | Hu et al. | |
| 8,085,049 B2 | 12/2011 | Bittar et al. | |
| 8,085,050 B2 | 12/2011 | Bittar et al. | |
| 8,174,265 B2 | 5/2012 | Bittar et al. | |
| 8,200,437 B2 | 6/2012 | Davydycheva et al. | |
| 8,222,902 B2 | 7/2012 | Bittar et al. | |
| 8,264,228 B2 | 9/2012 | Bittar et al. | |
| 8,274,289 B2 | 9/2012 | Bittar et al. | |
| 8,347,985 B2 | 1/2013 | Bittar et al. | |
| 8,571,797 B2 | 10/2013 | Wu et al. | |
| 8,636,061 B2 | 1/2014 | Mosse et al. | |
| 8,749,243 B2 | 6/2014 | Bittar et al. | |
| 8,917,094 B2 | 12/2014 | Bittar et al. | |
| 9,364,905 B2 | 6/2016 | Hou et al. | |
| 2005/0024060 A1 | 2/2005 | Bittar | |
| 2005/0256642 A1 * | 11/2005 | Barber | G01V 3/38 |
| | | | 702/6 |
| 2007/0075455 A1 | 4/2007 | Marini et al. | |
| 2007/0235225 A1 | 10/2007 | Bittar | |
| 2008/0033654 A1 | 2/2008 | Bespalov et al. | |
| 2010/0082255 A1 * | 4/2010 | Davydycheva | G01V 3/28 |
| | | | 702/7 |
| 2010/0156424 A1 | 6/2010 | Bittar et al. | |
| 2010/0198569 A1 | 8/2010 | Wu et al. | |
| 2010/0262370 A1 | 10/2010 | Bittar et al. | |
| 2010/0277176 A1 * | 11/2010 | Homan | E21B 47/102 |
| | | | 324/333 |
| 2010/0284250 A1 | 11/2010 | Cornish et al. | |
| 2011/0006773 A1 | 1/2011 | Bittar | |
| 2011/0161009 A1 | 6/2011 | Wang | |
| 2011/0175899 A1 | 7/2011 | Bittar et al. | |
| 2011/0180327 A1 | 7/2011 | Bittar et al. | |
| 2011/0186290 A1 | 8/2011 | Roddy et al. | |
| 2011/0187556 A1 | 8/2011 | Roddy et al. | |
| 2011/0192592 A1 | 8/2011 | Roddy et al. | |
| 2011/0199088 A1 | 8/2011 | Bittar | |
| 2011/0199228 A1 | 8/2011 | Roddy et al. | |
| 2011/0204897 A1 | 8/2011 | Hu et al. | |
| 2011/0221443 A1 | 9/2011 | Bittar et al. | |
| 2011/0234230 A1 | 9/2011 | Bittar et al. | |
| 2011/0251794 A1 | 10/2011 | Bittar et al. | |
| 2011/0298461 A1 | 12/2011 | Bittar et al. | |
| 2011/0308859 A1 | 12/2011 | Bittar et al. | |
| 2012/0001637 A1 | 1/2012 | Bittar et al. | |
| 2012/0024600 A1 | 2/2012 | Bittar et al. | |
| 2012/0133367 A1 | 5/2012 | Bittar et al. | |
| 2012/0186873 A1 | 7/2012 | Shayegi et al. | |
| 2012/0199394 A1 | 8/2012 | Bittar et al. | |
| 2012/0234605 A1 | 9/2012 | Donderici et al. | |
| 2012/0249149 A1 | 10/2012 | Bittar et al. | |
| 2013/0073206 A1 | 3/2013 | Hou et al. | |
| 2014/0324353 A1 | 10/2014 | Hou et al. | |

FOREIGN PATENT DOCUMENTS

| | | |
|---|---|---|
| EP | 2510385 | 10/2012 |
| GB | 2 379 989 | 3/2003 |
| WO | 2007/149106 | 12/2007 |
| WO | 2008/008386 | 1/2008 |
| WO | 2008/021868 | 2/2008 |
| WO | 2008/076130 | 6/2008 |
| WO | 2008/115229 | 9/2008 |
| WO | 2009/091408 | 7/2009 |
| WO | 2011/012379 | 2/2011 |
| WO | 2011/123379 | 10/2011 |
| WO | 2011/129828 | 10/2011 |
| WO | 2012/005737 | 1/2012 |
| WO | 2012/008965 | 1/2012 |
| WO | 2012/064342 | 5/2012 |
| WO | 2013/025222 | 2/2013 |
| WO | 2013/066297 | 5/2013 |

OTHER PUBLICATIONS

MX Second Office Action, dated May 20, 2016, Appl No. MX/a/2014/004876, "Multi-Component Induction Logging Systems and Methods Using Real-Time OBM Borehole Correction, " filed Oct. 31, 2011, 2 pgs.
U.S. Non-Final Office Action, dated Dec. 22, 2016, U.S. Appl. No. 14/355,289, "Multi-Component Induction Logging Systems and Methods Using Real-Time OBM Borehole Correction," filed Apr. 30, 2014, 20 pgs.
Au Patent Examination Report No. 1, dated Mar. 13, 2015, Appl No. 2011380527,"Multi-Component Induction Logging Systems and

(56) References Cited

OTHER PUBLICATIONS

Methods Using Real-Time OBM Borehole Correction", filed Oct. 31, 2011, 2 pgs.

CA Notification of Requisition by Examiner, dated May 5, 2014, Appl. No. 2,786,913, "Multi-Step Borehole Correction Scheme for Multi-Component Induction Tools," filed Mar. 28, 2011, 3 pgs.

EPO Supplementary Search Report, dated Jun. 26, 2015, Appl No. 11875150.2, "Multi-Component Induction Logging Systems and Methods Using Real-Time OBM Borehole Correction," filed Oct. 31, 2011, 8 pgs.

PCT International Preliminary Report on Patentability, dated Jan. 29, 2014, Appl No. PCT/US11/58619, "Multi-Component Induction Logging Systems and Methods Using Real-Time OBM Borehole Correction," filed Oct. 31, 2011, 12 pgs.

PCT International Preliminary Report on Patentability, dated Oct. 11, 2012, Application No. PCT/US2011/030145, "Multi-Step Borehole Correction Scheme for Multi-Component Induction Tools", filed Mar. 28, 2011, 6 pgs.

PCT International Search Report and Written Opinion, dated Mar. 16, 2012, Appl No. PCT/US2011/058619, "Multi-Component Induction Logging Systems and Methods Using Real-Time OBM Borehole Correction", filed Oct. 31, 2011, 7 pgs.

PCT International Search Report and Written Opinion, dated Jun. 1, 2011, Application No. PCT/US11/30145, "Multi-Step Borehole Correction Scheme for Multi-Component Induction Tools", filed Mar. 28, 2011, 8 pgs.

U.S. Non-Final Office Action, dated Jun. 16, 2015, U.S. Appl. No. 13/521,756, "Multi-Step Borehole Correction Scheme for Multi-Component Induction Tools," filed Jul. 12, 2012, 19 pgs.

Hou, Junsheng et al., "Fast Finite-Difference Simulation of 3D Borehole EM Fields Using Scattered Potentials", SEG International Exposition and Annual Meeting, 2009,, 436-440.

Hou, Junsheng et al., "New Scattered Potential Finite-Difference Method with Anisotropic Background to Simulate Multicomponent Induction Logs", PIERS, 2011, 12 pgs., Suzhou, China.

Moorkamp, Max et al., "A framework for 3D joint inversion of MT, gravity and seismic refraction data", Geophys. J. Int. (2011) 184 (1): 477-493. doi: 10.1111/j.1365-246X.2010.04856.x, Sep. 27, 2010, 34 pgs.

Moran, J. H. et al., "Effects of Formation Anisotropy of Resistivity-Logging Measurements", Geophysics, vol. 44, No. 7, (Jul. 1979), p. 1266-1286, 21 Figs., 4 Tables.

Sun, X. et al., "Analysis and Correction of Borehole Effect on the Responses of Multicomponent Induction Logging Tools", Progress in Electromagnetics Research, PIER 85, URL <http://www.jpier.org/PIER/pier85/11.08072206.pdf>, 2008, pp. 211-226.

Wang, Hanming et al., "Triaxial Induction Logging: Theory, Modeling, Inversion, and Interpretation" Society of Petroleum Engineers International Oil & Gas Conference and Exhibition; SPE 103897-MS; Beijing, China, Dec. 2006, 19 pgs.

Wu, P. et al., "Borehole Effects and Cprrection in OBM With Dip and Anisotrophy for Triaxial Induction Tools", Society of Petroleum Engineers Annual Technical Conference and Exhibition; SPE 110623-MS; Anaheim, CA, U.S.A, Nov. 2007, 20 pgs.

Zhong, Lili et al., "Simulation of Tri-Axial Induction Logging Tools in Layered Anisotropic Dipping Formations", SEG 2006 Annual Meeting, p. 456-460, New Orleans, Louisiana.

* cited by examiner

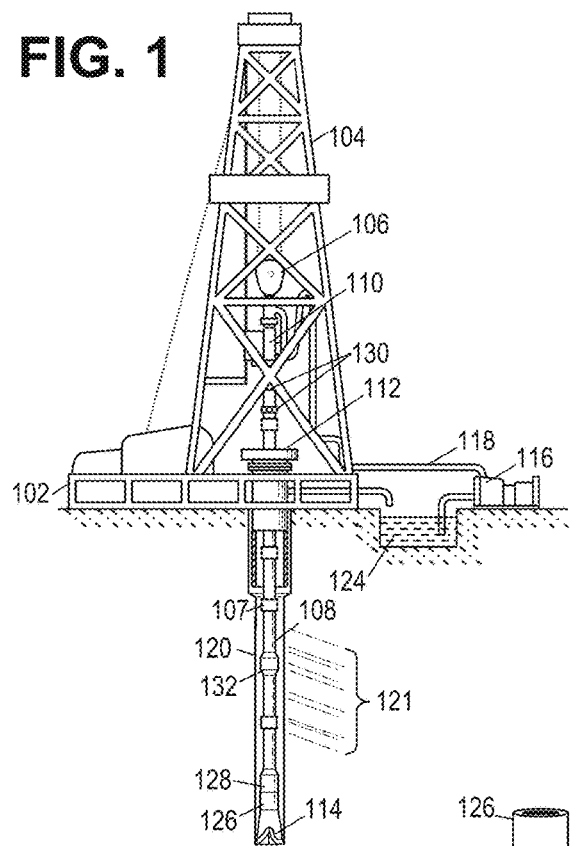
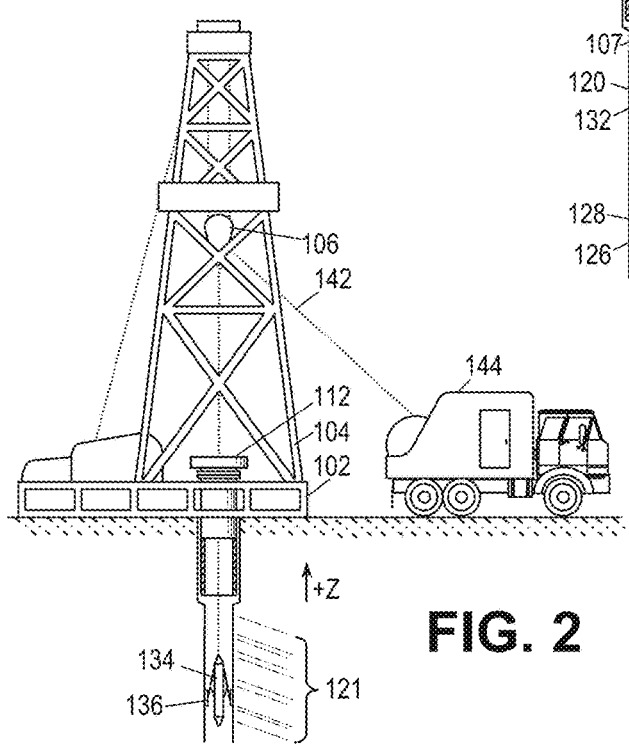
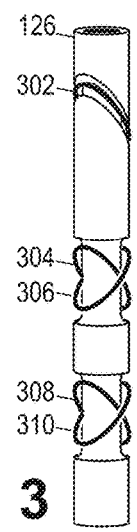
FIG. 1
FIG. 2
FIG. 3

MULTI-STEP BOREHOLE CORRECTION SCHEME FOR MULTI-COMPONENT INDUCTION TOOLS

CROSS-REFERENCE TO RELATED APPLICATIONS

The present application claims priority to Provisional U.S. Pat. App. No. 61/319,291, titled "Multi-Step Borehole Correction Scheme for Multi-Component Induction Tools" and filed Mar. 31, 2010 by inventors Junsheng Hou and Michael Bittar. This application is hereby incorporated herein by reference.

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference ($\Phi$) and amplitude ratio (attenuation, A) of the induced voltages in the receiver antennas are indicative of the resistivity of the formation. The depth of investigation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta=[R_v/R_h]^{1/2}$.

The relative dip angle, $\theta$, is the angle between the tool axis and the normal to the plane of the formation. Resistive anisotropy and relative dip angle each have significant effects on resistivity logging tool measurements. As a result, resistivity logging systems should account for formation anisotropy and relative dip if accurate resistivity logs are to be obtained. In U.S. Pat. No. 6,163,155, Michael Bittar discloses one such approach that employs resistivity logging tools having tilted transmitter and/or receiver antennas. Bittar and Hu further disclose certain techniques for processing measurements from such tilted antenna logging tools in related application numbers PCT/US06/62149 and PCT/US07/64221. Improvements to these disclosed approaches have been developed and are presented herein.

BRIEF DESCRIPTION OF THE DRAWINGS

A better understanding of the disclosed embodiments can be obtained when the following detailed description is considered in conjunction with the attached drawings, in which:

FIG. 1 shows an illustrative logging while drilling environment including dipping formation beds;

FIG. 2 shows an illustrative wireline logging environment including dipping formation beds;

FIG. 3 shows an illustrative antenna configurations for a multi-component induction logging tool;

Figure 4:
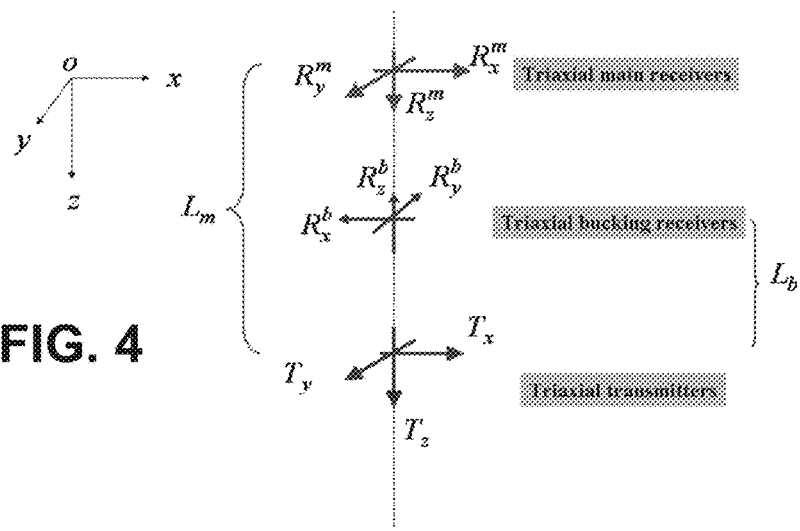
FIG. 4 shows an illustrative tool model suitable for defining a measured conductivity tensor.

By way of example, specific system and method embodiments are shown in the drawings and are described in detail below. It should be understood, however, that the drawings and detailed description are not intended to limit the disclosure, but on the contrary, the intention is to cover all modifications, equivalents, and alternatives falling within the scope of the appended claims.

DETAILED DESCRIPTION

Accordingly various tools, systems, and methods are disclosed for multi-component induction logging with multi-step borehole correction. At least some system embodiments include a logging tool and at least one processor. The logging tool provides transmitter-receiver coupling measurements that include at least direct coupling along the longitudinal tool axis (Czz), direct coupling along the perpendicular axis (Cxx or Cyy), and cross coupling along the longitudinal and perpendicular axes (Cxz, Cyz, Czx, or Czy). The processor performs a multi-step inversion of said transmitter-receiver coupling measurements to obtain values for model parameters (e.g., Rh, Rv, dip, and eccentricity). Based at least in part on the model parameters, the processor determines borehole corrections for the transmitter-receiver coupling measurements and may further provide one or more logs derived from the borehole corrected transmitter-receiver coupling measurements. In at least some embodiments the logging tool assembly further collects borehole size measurements and measurements of borehole fluid resistivity for use in performing the inversion and determining the borehole corrections.

The disclosed tool, systems and methods are best understood in the context of the larger systems in which they operate. Accordingly, FIG. 1 shows an illustrative logging while drilling (LAVD) environment. A drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the hi borehole into the pit 124 and aids in maintaining the integrity of the borehole 120.

In wells employing acoustic telemetry for LWD, downhole sensors (including resistivity logging tool 126) are coupled to a telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the tool, thereby enabling adjustment of the tool's configuration and operating parameters. In some embodiments, the telemetry module 128 also or alternatively stores measurements for later retrieval when the tool returns to the surface.

An resistivity logging tool 126 is integrated into the bottom-hole assembly near the bit 114. The logging tool 126 may take the form of a drill collar, i.e., a thick-walled tubular that provides weight and rigidity to aid the drilling process. As the bit extends the borehole through the formations, logging tool 126 collects multicomponent induction measurements as well as measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the tool includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, various resistivity logging tools disclosed herein can be used to steer the bit to the desirable bed.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity logging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIG. 3 shows an illustrative resistivity logging tool 126 having antennas for acquiring multi-component induction logging measurements. Resistivity logging tool 126 has a tilted transmit antenna 302 and two pairs of tilted receive antennas 306, 306 and 308, 310, thereby providing four transmit-receive antenna pairings. The tool acquires attenuation and phase measurements of each receive antenna's response to transmit antenna 302. In certain alternative embodiments, the tool measures in-phase and quadrature-phase components of the receive signals rather than measuring amplitude and phase. In either case, these measurements are collected and stored as a function of the tool's position and rotational orientation in the borehole.

The illustrated tool has receive antennas 304 and 308 oriented parallel to the transmit antenna 302, and receive antennas 306 and 310 oriented perpendicular to the transmit antenna. In the illustrated example, each of the antennas share a common rotational orientation, with antennas 302, 304, 308 being tilted at −45° and antennas 306, 310 being tilted at +45° relative to the longitudinal tool axis. In the illustrative tool embodiments, each of the coil antennas surrounding the tool is mounted in a recess and protected by a non-conductive filler material and/or a shield having non-conducting apertures. The tool body is primarily composed of steel. The relative tool dimensions and antenna spacings are subject to a great deal of variation depending on the desired tool properties. The distance between the receive coil pairs may be on the order of 0.25 m, while the spacing of the transmit coil to the midpoint between the receiver pairs may vary from about 0.4 m to over 10 m.

As disclosed in U.S. patent application Ser. No. 12/294, 557 "Antenna Coupling Component Measurement Tool . . . " filed Sep. 25, 2008 by inventors Michael Bittar and David Hu, the measurements taken by a tool of this kind as it rotates enable a full set of orthogonal coupling component measurements to be obtained at each point along the borehole axis. The orthogonal coupling component measurements correspond to the tool model shown in FIG. 4. A triad of transmitters Tx, Ty, Tz, represent magnetic dipole antennas oriented parallel to the tool's x, y, and z axes respectively. A triad of main receivers $R_x^m$, $R_y^m$, $R_z^m$ similarly represent magnetic dipole antennas oriented along these axes, as do a triad of bucking receivers $R_x^b$, $R_y^b$, $R_z^b$. The main receiver triad is spaced at a distance Lm from the transmitter triad, and the bucking receiver triad is spaced at a distance Lb from the transmitter triad. The signal measurements of the bucking receiver triad can be subtracted from the main receiver triad to eliminate the direct signal from the transmitter and increase sensitivity to formation properties. As explained by Moran and Gianzero, in "Effects of Formation Anisotropy on Resistivity Logging Measurements" Geophysics, Vol. 44, No. 7, p. 1266 (1979), the magnetic field h in the receiver coils can be represented in terms of the magnetic moments m at the transmitters and a coupling matrix C:

$$h = Cm \tag{1}$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \tag{2}$$

where $M_X$, $M_Y$, and $M_Z$ are the magnetic moments (proportional to transmit signal strength) created by transmitters $T_X$, $T_Y$ and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 4, if each transmitter is fired in turn, and signal measurements are made at each receiver in response to each firing, nine differential measurements ($R^m$-$R^b$) are obtained. These nine measurements enable the determination of a complete coupling matrix C. ($C_{IJ}=a_{IJ}V_{IJ}$, where I is the index for receiver axis x, y, z, and J is the index for transmitter axis x, y, z, $a_{IJ}$ is a constant determined by the tool design, and $V_{IJ}$ is a complex value representing the signal amplitude and phase shift measured by receiver I in response to the firing of transmitter J.) Given a coupling matrix for any given orientation of the tool, the system can apply simple rotational transformations to determine a corresponding matrix for any arbitrary tool orientation.

Figure 5:
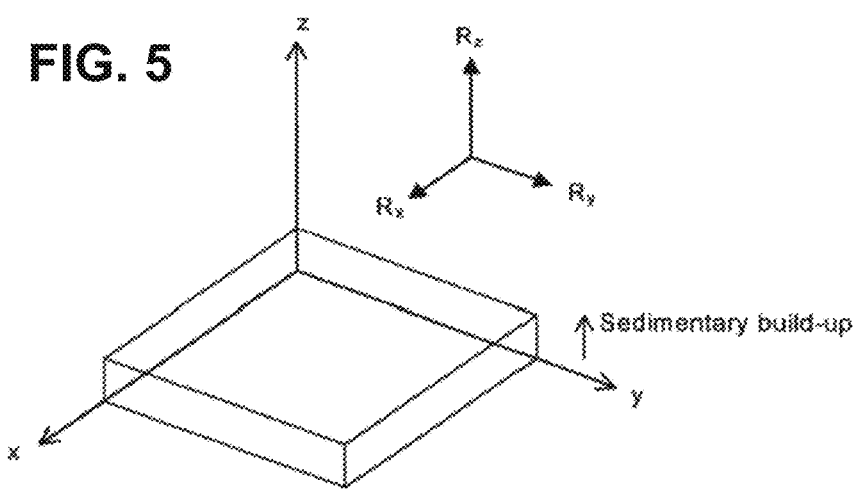
FIG. 5 is a schematic perspective view of a Cartesian coordinate system in a sedimentary earth formation.

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 5. FIG. 5 shows a portion of a sedimentary formation bed, with the z-axis oriented perpendicular to the plane of the formation in the direction of the sedimentary accretion. As previously mentioned, the formation resistivity when measured along this axis is often different than formation resistivity measured in the x-y plane. In a dipping bed, the x-axis may be chosen to be oriented in the direction of deepest ascent, i.e., "uphill".

In addition to the tool coordinate system and the formation coordinate system, a third coordinate system is employed herein. The borehole coordinate system has a z-axis that follows the central axis of the borehole. The x-axis of the borehole extends perpendicularly from the central axis through the high side of the borehole. (In a vertical borehole, the x-axis extends through the north side of the borehole.) The y-axis extends perpendicular to the other two axes in accordance with the right-hand rule.

Figure 6:
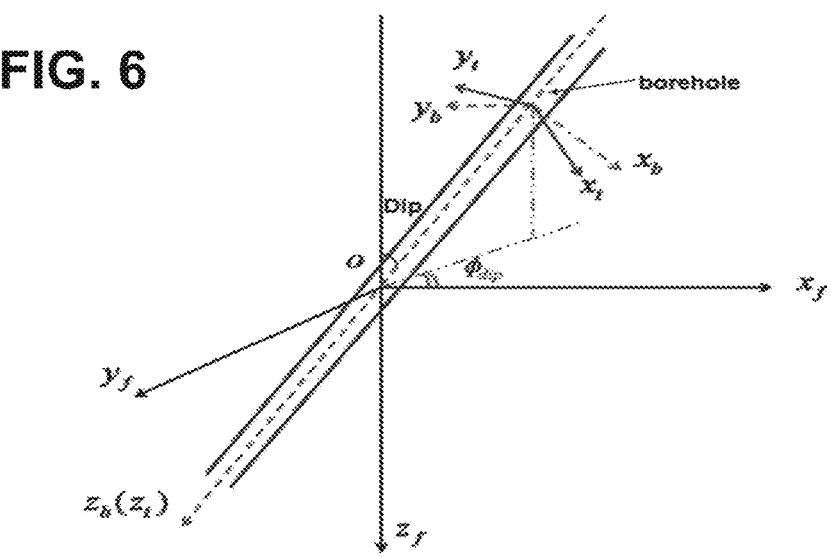
FIG. 6 shows a relationship between the coordinate systems of a tool, a borehole and a dipping formation bed.

FIG. 6 illustrates how the three coordinate systems may be related. The formation coordinate system $x_f$, $y_f$, $z_f$ is tied to the formation as explained previously, though due to symmetry the x- and y-axes can be shifted without affecting measurement of the formation properties. A borehole penetrates the formation. The angle between the formation z-axis and the central axis of the borehole is called the Dip angle. The dip azimuth $\phi_{dip}$ is the angle between the $x_f$-axis and the projection of the borehole axis into the $x_f$-$y_f$ plane. Because of the previously mentioned symmetry, the formation $x_f$-axis can be arbitrarily positioned so that the dip azimuth $\phi_{dip}$ is zero. (A side effect of this choice is that the borehole $x_b$-axis becomes contained in $x_f$-$z_f$ plane of the formation.)

Figure 7:
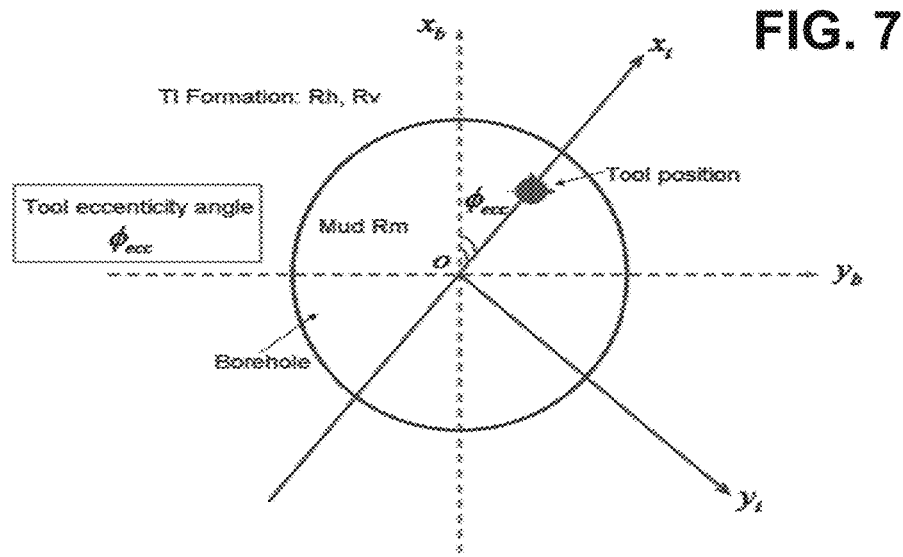
FIG. 7 shows a relationship between the coordinate systems of an eccentric tool and an elliptical borehole.

The z-axis of the tool coordinate system coincides with the z-axis of the borehole coordinate system. As indicated in FIG. 7, the x-axis of the tool coordinate system is chosen to correspond to the direction of the tool's displacement $d_{ecc}$ from the central borehole axis. The angle between the borehole's $x_b$-axis and the tool's $x_t$-axis is denoted as the eccentricity azimuth $\phi_{ecc}$. The $y_t$-axis of the tool coordinate system is of course perpendicular to the other two axes.

Treating FIGS. 4-7 as the basis of a model for predicting coupling component matrix measurements, the model parameters are horizontal resistivity of the formation $R_h$, vertical resistivity of the formation $R_v$, borehole diameter cal (short for caliper), borehole mud resistivity $R_m$, tool eccentricity displacement $d_{ecc}$, tool eccentricity azimuth $\phi_{ecc}$, relative dip angle dip, and relative dip azimuth $\phi_{dip}$. When shoulder-bed and boundary effects are ignored, the model assumes a circular borehole through an infinitely thick formation. Numerical simulations of the multi-component induction log response show that for a given array spacing and frequency, the foregoing parameters are sufficient. The coupling matrix components depend on the various parameters in different ways. For example, the Czz component is independent of the azimuthal angles $\phi_{ecc}$ and $\phi_{dip}$. This observation enables the parameter inversion process to be efficiently broken into relatively small, independent steps as illustrated in FIGS. 8-10.

Figure 8:
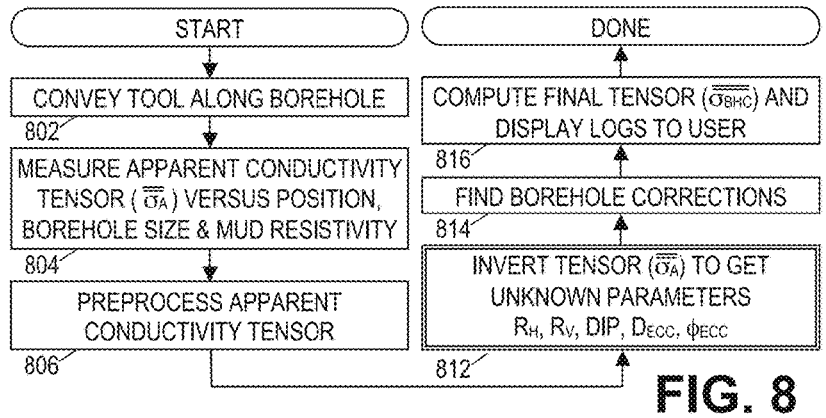
FIG. 8 is a flow diagram of an illustrative borehole correction method for a measured conductivity tensor.

FIG. 8 is a flow diagram of an illustrative borehole correction process. It begins in block 802 with the conveyance of a multi-component logging tool along a borehole. In block 804, as the tool is being conveyed along the borehole, it tool measures the components of the apparent conductivity tensor as a function of the tool's position in the borehole. The tool also measures borehole size cal and borehole fluid resistivity $R_m$. In block 806, the system preprocesses the conductivity tensor and borehole size logs. Such preprocessing can include adaptive low-pass filtering to remove high-frequency measurement noise and/or to correct for skin-effect. In block 812 one of two inversion processes (discussed in FIGS. 9 and 10 below) is applied to determine the unknown model parameters Rh, Rv, dip, $D_{ecc}$, and $\phi_{ecc}$. These model parameters are then employed in block 814 to predict tool responses in models with and without a borehole. The differences between these predicted tool responses is the borehole correction which the system applies to the measured coupling matrix. In block 816, one or more components of this corrected coupling matrix is made accessible in the form of a log to a user. If desired, the coupling matrix component logs can also be post processed by other applications to correct for shoulder-bed and boundary effects.

Figure 9:
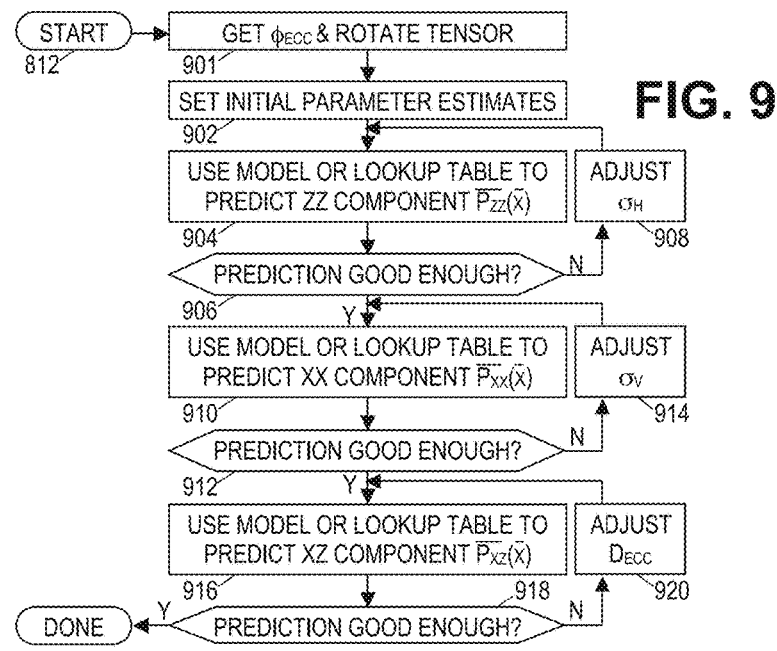
FIG. 9 is a flow diagram of an illustrative multi-step inversion method for vertical boreholes.
Figure 10:
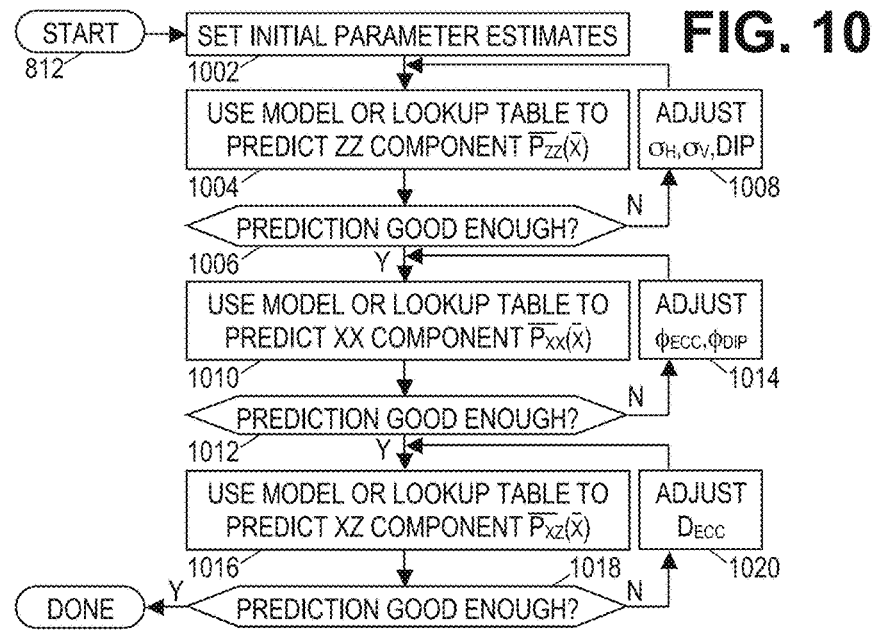
FIG. 10 is a flow diagram of an illustrative multi-step inversion method for dipping formations.

FIG. 9 is a flow diagram of an illustrative inversion process 812 for vertical boreholes (i.e., the relative dip between the borehole and formation is dip=0). It advantageously splits the high-dimensional inversion problem into multiple, reduced-dimension inversion steps based on the particular sensitivity of certain coupling components to individual model parameters. For example, in a vertical borehole the Czz component is insensitive to vertical resistivity Rv, and all of the direct-coupling components (Czz, Cxx, Cyy) are relative insensitive to tool eccentricity. The cross components Cxz and Czx are almost linearly dependent on tool eccentricity.

The eccentricity azimuth $\phi_{ecc}$ can be solved independently of other model parameters by a coordinate rotation. Accordingly, the process in FIG. 9 begins in block 901 with a determination of the eccentricity azimuth $\phi_{ecc}$:

$$\phi_{ecc} = \arctan\left(\frac{C_{yz} + C_{zy}}{C_{xz} + C_{zx}}\right) \tag{3a}$$

$$\phi_{ecc} = \frac{1}{2}\arctan\left(\frac{C_{xy} + C_{yx}}{C_{xx} - C_{yy}}\right), \text{ or} \tag{3b}$$

$$\phi_{ecc} = \arctan\left(\frac{C_{yz} - C_{zy}}{C_{xz} - C_{zx}}\right) \tag{3c}$$

Equations (3a) and (3b) are suitable for use in a vertical well, whereas equation (3c) should be used for non-vertical wells.

In block 902, the system set initial estimates for the remaining unknown model parameters. The estimates can be set randomly, or may be guesses based on previous inversion solutions. Other alternatives include having typical "average" parameter values pre-programmed into the software. Given the initial estimates, the system in block 904 determines the expected tool measurement for the Czz component. (This predicted tool measurement is hereafter represented as Pzz to distinguish it from the actual tool measurement Czz.) A whole vector of Pzz values can be determined along the length of the borehole for comparison with the actual tool measurements. In block 906 the system determines whether the optimum value for Rh has been found, and if not, the estimate for Rh is adjusted in block 908 and the loop is repeated. In at least some embodiments, the system repeats the loop as necessary to find the value of Rh (within a given range of realistic values) that minimizes the error $$\varepsilon = \|\overline{W_{zz}} \cdot (\overline{P_{zz}} - \overline{C_{zz}})\|^p, \quad (4)$$

where Wzz is a vector of weights that de-emphasizes measurements near the upper and lower ends of the logged interval. In other embodiments, the system repeats the loop as necessary to obtain an error value below a predetermined threshold.

Once the horizontal resistivity has been found, the system uses it in combination with the other estimated parameters to determine a predicted tool measurement for Cxx in block 910. (The predicted measurement is hereafter represented as Pxx.) In block 912, the system determines whether the optimum value for Rv has been found, and if not, the estimate for Rv is adjusted in block 914. As before, the system may repeat the loop as necessary to find a realistic value of Rv that minimizes the error $$\varepsilon = \|\overline{W_{xx}} \cdot (\overline{P_{xx}} \cdot \overline{C_{xx}})\|^p, \quad (5)$$

or at least drops the error below a predetermined threshold value.

Once both the horizontal and vertical resistivities have been found, the system uses them in combination with the other estimated parameters to determine a predicted tool measurement for Cxz in block 916. (The predicted measurement is hereafter represented as Pxz.) In block 918, the system determines whether an optimum value for $d_{ecc}$ has been found, and if not, the system adjusts the estimate for $d_{ecc}$ in block 920. As before the system repeats the loop as necessary to find a realistic value that minimizes the error $$\varepsilon = \|\overline{W_{xz}} \cdot (\overline{P_{xz}} \cdot \overline{C_{xz}})\|^p, \quad (6)$$

or at least drops it below a predetermined threshold value. The updates in each of blocks 908, 914, 920 can be done systematically (e.g., for an exhaustive search) or adaptively (e.g., in a Newton-Raphson search for a minimum value). The determinations of predicted values in each of blocks 904, 910, and 916 can be done in a number of ways including a pre-programmed simulation. In at least some embodiments, a look-up table is used to expedite the process. The table comprises pre-calculated tool responses at each of multiple grid points in the space of realistic parameter values. A fast high-dimensional spline interpolation method can be used to determine predicted responses between grid points. The Cyy component can be used in addition or as an alternative to the Cxx component in blocks 910-914, and the Czx component can be used in addition or as an alternative to the Cxz component in blocks 916-920.

FIG. 10 is a flow diagram of an illustrative inversion process 812 for non-vertical boreholes (i.e., the dip angle is nonzero). As with the process of FIG. 9, the high-dimensional inversion problem is split into multiple, reduced-dimension inversion steps based on the particular sensitivity of certain coupling components to individual model parameters. For example, the Czz component is insensitive to the azimuthal angles $\phi_{ecc}$ and $\phi_{dip}$. Moreover, the long-spacing Czz component measurements are relatively insensitive to $d_{ecc}$, especially in oil-based muds (OBM) and freshwater based muds (FWBM). The Cxx and Cyy component measurements are also somewhat insensitive to $d_{ecc}$ in OBM and FWBM.

Accordingly, the process in FIG. 10 begins in block 1002 with the system setting initial estimates for unknown parameter values. In block 1004, the system determines predicted tool measurement Pzz as a function of tool position. In block 1006 the system determines whether the error value (see equation (4)) is minimized or otherwise acceptable, and if not, the system adjusts the Rh, Rv, and dip values in block 1008. The adjustments can be done systematically or adaptively as described previously. Once an acceptable match between predicted and measured responses have been found, the system determines the predicted tool measurement Pxx in block 1010. In block 1012 the system determines where the error value (see equation (5)) is minimized or otherwise acceptable, and if not, the system adjusts the azimuthal angles $\phi_{ecc}$ and $\phi_{dip}$ in block 1014. Again, once an acceptable match between predicted and measured responses have been found, the system determines predicted tool measurement Pxz. In block 1018 the system determines whether the error value (see equation (6)) is minimized or is otherwise acceptable. If not, the system adjusts the eccentricity displacement $d_{ecc}$ in block 1020. Once an acceptable match is found, the inversion process 812 concludes and the system determines a borehole correction in block 814 (FIG. 8).

Figure 11:
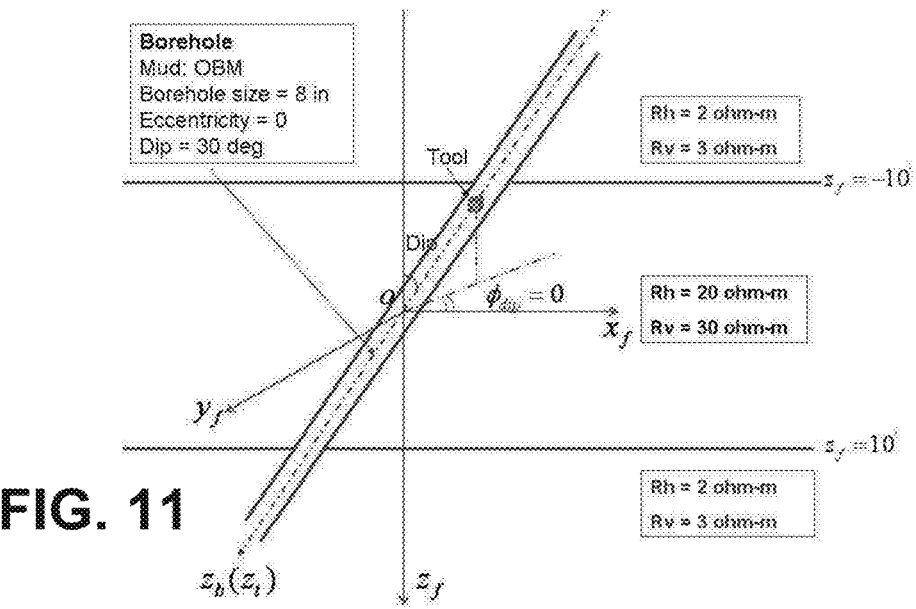
FIG. 11 shows an illustrative test geometry.

FIG. 11 shows a formation model that is used below to verify the methods disclosed above. FIG. 11 shows a three-layer transversely-isotropic (TI) formation with a 30-degree deviated borehole (dip=30°). Simulated nine-component tool responses are determined using a full three-dimensional finite difference algorithm. The model assumes no invasion of borehole fluid into the formation. The upper and lower formation layers each have horizontal resistivity Rh of 2 ohm-m and vertical resistivity Rv of 3 ohm-m. The middle layer has horizontal resistivity of 20 ohm-m and vertical resistivity of 30 ohm-m, and its thickness is 20 feet. The borehole diameter is 8 inches, and the mud resistivity Rm is 1000 ohm-m (OBM). The simulated logging tool includes 4 triaxial sub-arrays (transmitter-receiver separations of 17", 29", 50", and 80") each operated at 3 frequencies: 12 kHz, 36 kHz, and 72 kHz and the tool is centered in the borehole ($d_{ecc}=0$). Other model parameters are shown in FIG. 11.

For comparison with the borehole-corrected responses, multicomponent induction logs without a borehole have also been calculated using an electromagnetic semi-analytical solution for one-dimensional layered anisotropic media. In all forward computations point dipoles are used to model the tool's finite-sized coils.

Figure 12:
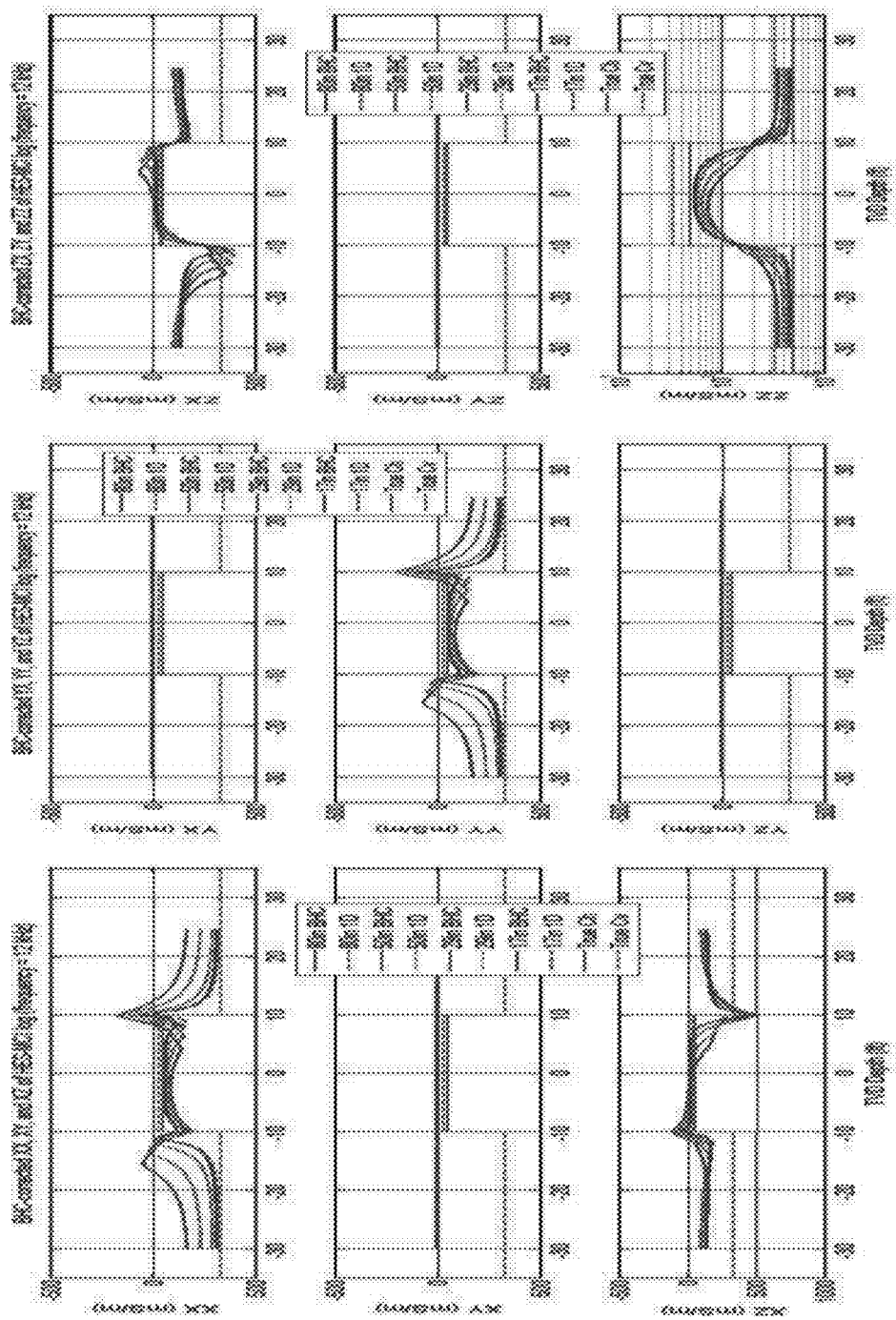
FIGS. 12-14 show illustrative borehole correction results at signal frequencies of 12, 36, and 72 kHz.
Figure 13:
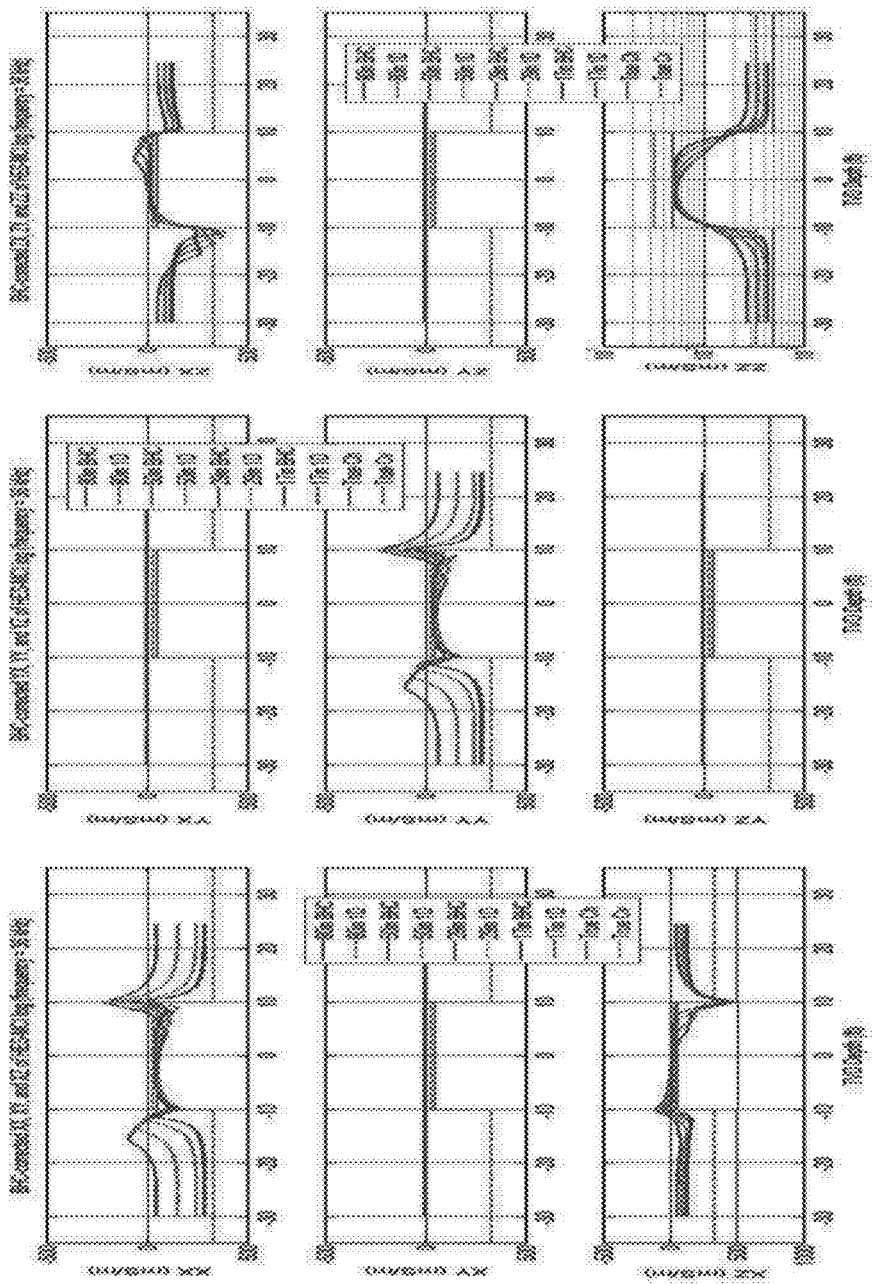
Figure 14:
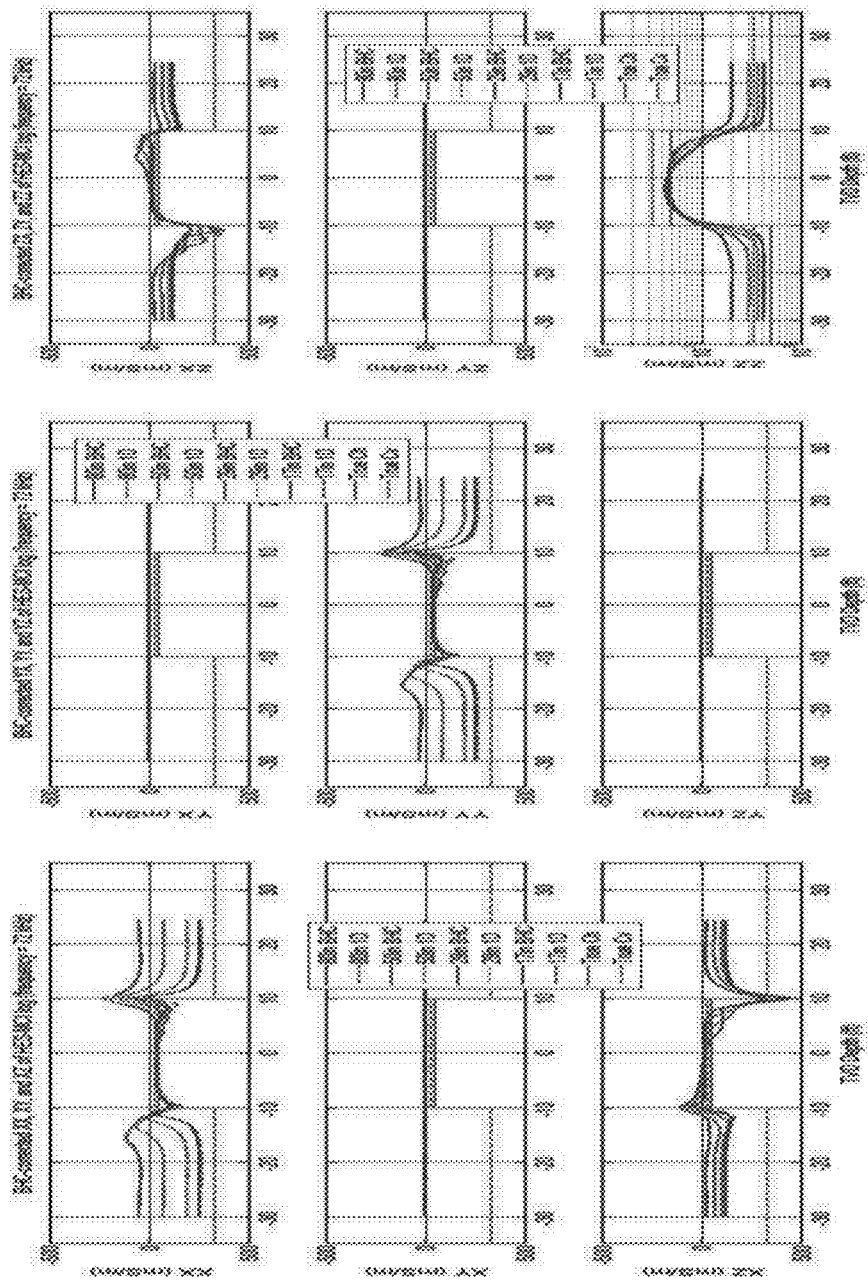

FIGS. 12, 13, and 14 show the results of applying the disclosed borehole correction (BHC) method to the responses of the tool as determined using the 3D finite difference model. The BHC nine-component logs at the frequencies of 12 kHz (FIG. 12), 36 kHz (FIG. 13), and 72 kHz (FIG. 14) are compared to the vertical 1D semi-analytical EM logs. All comparisons show very good agreements between the BHC responses and the 1D semi-analytical logs.

Thus the disclosed real-time borehole correction system for processing multi-component induction logging data is expected to perform well. The inversion algorithm is implemented by splitting the original inversion problem of one high-dimension unknown vector into a few lower-dimension ones based on their sensitivity of different model parameters to different components of the measured conductivity tensor for different sub-arrays. Numerical tests show this dimensionality reduction makes the complicated BHC inversion overall easier, more reliable and robust. Because the 3D MCI simulation is very time-consuming, the forward modeling used in the inversion is based on the pre-calculated look-up table on a grid covering all feasible ranges of borehole-formation model parameters. This makes the BHC inversion very fast and the whole BHC processing applicable in real time or well site manner.

What is claimed is:

1. A logging method that comprises:
    conveying a logging tool along a borehole through a formation to gather multi-component transmitter-receiver coupling measurements, wherein the logging tool comprises a transmitter antenna and a receiver antenna;
    inducing an electromagnetic field in a formation with the transmitter antenna;
    recording the multi-component transmitter-receiver coupling measurements form an electrical voltage of the formation with the receiver antenna;
    performing a multi-step inversion of the multi-component coupling measurements to obtain values for model parameters, the multi-step inversion including:
    choosing an expected tool measurement of a horizontal conductivity or resistivity;
    inverting the expected tool measurement of the horizontal conductivity or resistivity to a tool measurement of the horizontal conductivity or resistivity;
    adjusting the horizontal conductivity or resistivity of the formation to reduce a mismatch between a measured and predicted direct coupling along a longitudinal tool axis;
    choosing an expected tool measurement of a vertical conductivity or resistivity;
    inverting the expected tool measurement of the vertical conductivity or resistivity to a tool measurement of the vertical conductivity or resistivity;
    adjusting the vertical conductivity or resistivity of the formation to reduce a mismatch between a measured and predicted direct coupling along a tool axis perpendicular to the longitudinal tool axis; and
    choosing an expected tool measurement of a eccentricity displacement;
    inverting the expected tool measurement of the eccentricity displacement to a tool measurement of the eccentricity displacement;
    adjusting the eccentricity displacement $d_{ecc}$ to reduce a mismatch between a measured and predicted cross-coupling along the longitudinal and perpendicular tool axes;
    determining borehole corrected values for said multi-component transmitter receiver coupling measurements based at least in part on said model parameters; and
    displaying a log based at least in part on at least one of said borehole corrected values.

2. The method of claim 1, wherein said logging tool also collects borehole size measurements during said conveying.

3. The method of claim 2, wherein said logging tool further collects measurements of borehole fluid resistivity during said conveying.

4. The method of claim 1, wherein said performing a multi-step inversion includes preprocessing the transmitter-receiver coupling measurements with an adaptive low-pass filter.

5. The method of claim 1, wherein said determining includes:
    predicting multi-component transmitter-receiver coupling measurements with and without a borehole;
    calculating differences between the predicted measurements with and without the borehole to determine borehole corrections; and
    applying the borehole corrections to the gathered multi-component transmitter-receiver coupling measurements to obtain said borehole corrected values.

6. The method of claim 1, wherein the model parameters are for a vertical borehole model.

7. The method of claim 1, wherein the logging tool includes receiver antennas at different distances from a transmitter antenna.

8. The method of claim 1, wherein the logging tool is a logging while drilling tool that is conveyed along the borehole as part of a drill string.

9. The method of claim 1, wherein the logging tool is conveyed along the borehole with a wireline.

10. A logging system that comprises:
    a logging tool having a longitudinal tool axis and a perpendicular tool axis, the tool having an antenna arrangement that provides, as a function of tool position in a borehole, transmitter-receiver coupling measurements that include at least direct coupling along the longitudinal tool axis (Czz), direct coupling along the perpendicular axis (Cxx), and cross coupling along the longitudinal and perpendicular axes (Cxz);
    at least one processor that:
    performs a multi-step inversion of said transmitter-receiver coupling measurements to obtain values for model parameters, the multi-step inversion including:
    choosing an expected tool measurement of a horizontal conductivity or resistivity;
    inverting the expected tool measurement of the horizontal conductivity or resistivity to a tool measurement of the horizontal conductivity or resistivity;
    adjusting the horizontal conductivity or resistivity to reduce a mismatch between a measured and predicted direct coupling along a longitudinal tool axis (Czz);
    choosing an expected tool measurement of a vertical conductivity or resistivity;
    inverting the expected tool measurement of the vertical conductivity or resistivity to a tool measurement of the vertical conductivity or resistivity;
    adjusting the vertical conductivity or resistivity to reduce a mismatch between a measured and predicted direct coupling along a tool axis (Cxx) perpendicular to the longitudinal tool axis; and
    choosing an expected tool measurement of a eccentricity displacement;
    inverting the expected tool measurement of the eccentricity displacement to a tool measurement of the eccentricity displacement;
    adjusting the eccentricity displacement $d_{ecc}$ to reduce a mismatch between a measured and predicted cross-coupling along the longitudinal and perpendicular tool axes (Cxz);

determines borehole corrected values for said transmitter-receiver coupling measurements based at least in part on said model parameters; and provides a log based at least in part on at least one of said borehole corrected values.

11. The system of claim 10, wherein the processor is coupled to a user interface to display said log.

12. The system of claim 10, wherein the logging tool further provides borehole size measurements.

13. The system of claim 10, wherein the logging tool further provides measurements of borehole fluid resistivity.

14. The system of claim 10, wherein as part of performing the multi-step inversion, the at least one processor applies a low-pass filter to said transmitter-receiver coupling measurements.

15. The system of claim 10, wherein as part of said determining, the at least one processor:

predicts multi-component transmitter-receiver coupling measurements with and without a borehole;

differences the predicted measurements with and without the borehole to determine borehole corrections; and applies the borehole corrections to the multi-component transmitter-receiver coupling measurements provided by the logging tool.

16. The system of claim 10, wherein the model parameters are for a vertical borehole model.

17. The system of claim 10, wherein the logging tool includes receiver antennas at different distances from a transmitter antenna.

18. The system of claim 17, wherein the logging tool includes a tilted transmit antenna and two pairs of tilted receive antennas.

19. The system of claim 10, wherein the logging tool is a logging while drilling tool that is conveyed along the borehole as part of a drill string.

20. The system of claim 10, wherein the logging tool is conveyed along the borehole with a wireline.

* * * * *